INVENTOR.
WESLEY V. SMITH.

June 1, 1954  W. V. SMITH  2,680,044
MIXING AND DISTRIBUTING DEVICE
Filed Sept. 29, 1951  3 Sheets-Sheet 3

INVENTOR.
WESLEY V. SMITH.
BY
Salvatore G. Militana
ATTORNEY.

Patented June 1, 1954

2,680,044

UNITED STATES PATENT OFFICE 2,680,044

MIXING AND DISTRIBUTING DEVICE

Wesley V. Smith, Miami Springs, Fla.

Application September 29, 1951, Serial No. 248,972

6 Claims. (Cl. 299—84)

This invention relates to improvements in apparatus for mixing and distributing fertilizer, animal and plant insecticides, detergents and the like, in and with a stream of water or other fluids.

It is a primary object of the present invention to provide an improved mixing and distributing device embodying novel means for ensuring a thorough mixing of particles of material with the stream of water being utilized for distributing same.

A further object of the present invention is the provision of an improved mixer and distributor for fertilizers, insecticides and the like, utilizing a stream of water therefor, wherein the latter prevents the formation of lumps and cakes and compels a complete distribution of the material as long as a stream of water is permitted to flow therethrough.

A still further object of the present invention is to provide an improved mixer and distributor of fertilizers and the like with interchangeable means for regulating the rate of flow of the fertilizer mixture in the stream of water utilized for mixing and distributing the fertilizer.

A still further object of the present invention is the provision of automatic valve control means in a mixing and distributing device utilizing a stream of water, which results in a distribution of a mixture having a constant proportion with relation to the volume flow of water during the entire mixing and distributing operation.

With these and other objects in view, the invention will be best understood from a consideration of the following detailed description taken in connection with the accompanying drawings, forming a part of the present specification with the understanding, however, that the invention is not confined to any strict conformity with the showing of the drawings, but may be changed or modified so long as such changes or modifications mark no material departure from the salient features of the invention as expressed in the appended claims.

Figure 1:
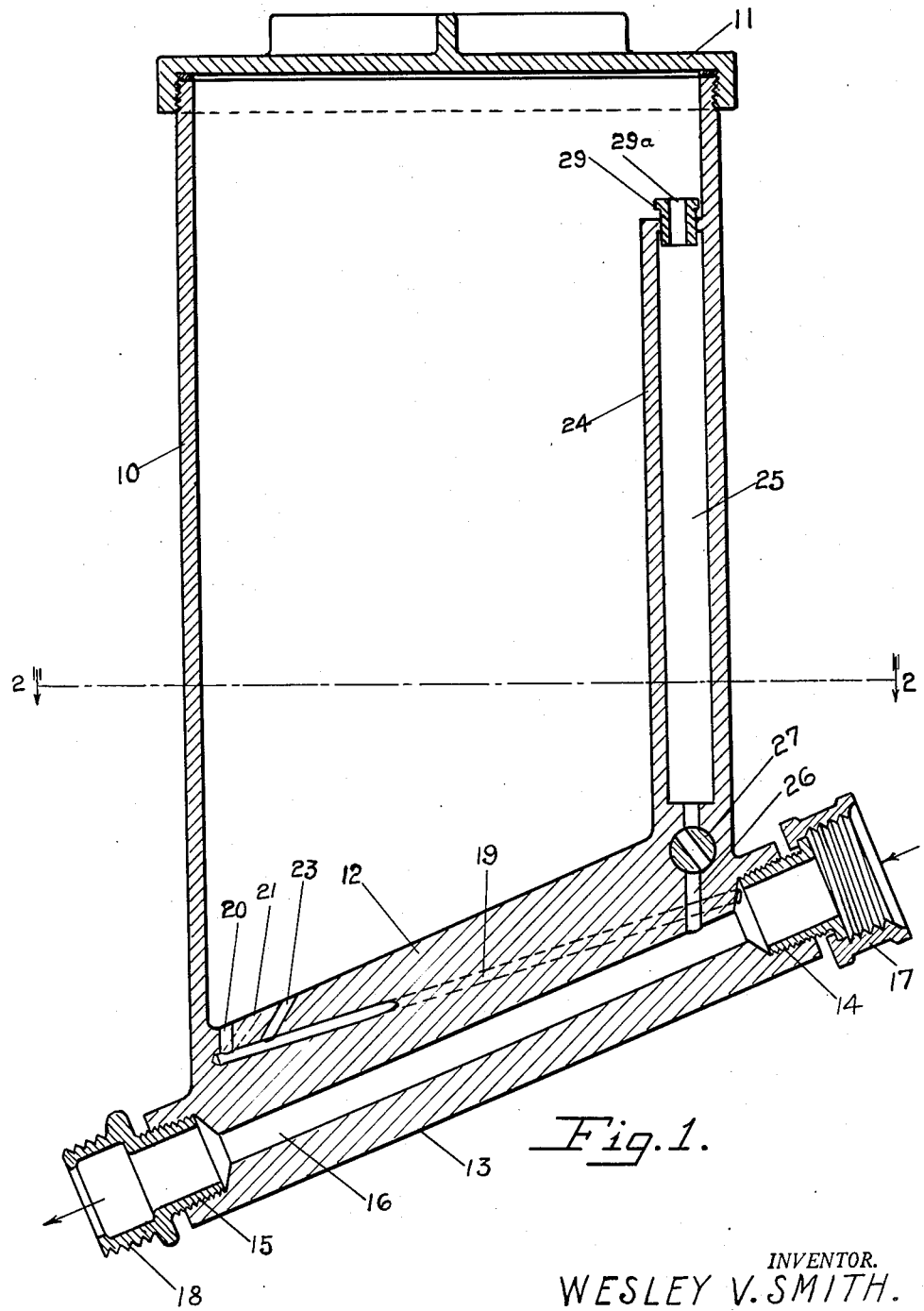
Figure 1 is a vertical sectional view of a mixing and distributing device embodying my invention taken through 1—1 of Figure 2.
Figure 2:
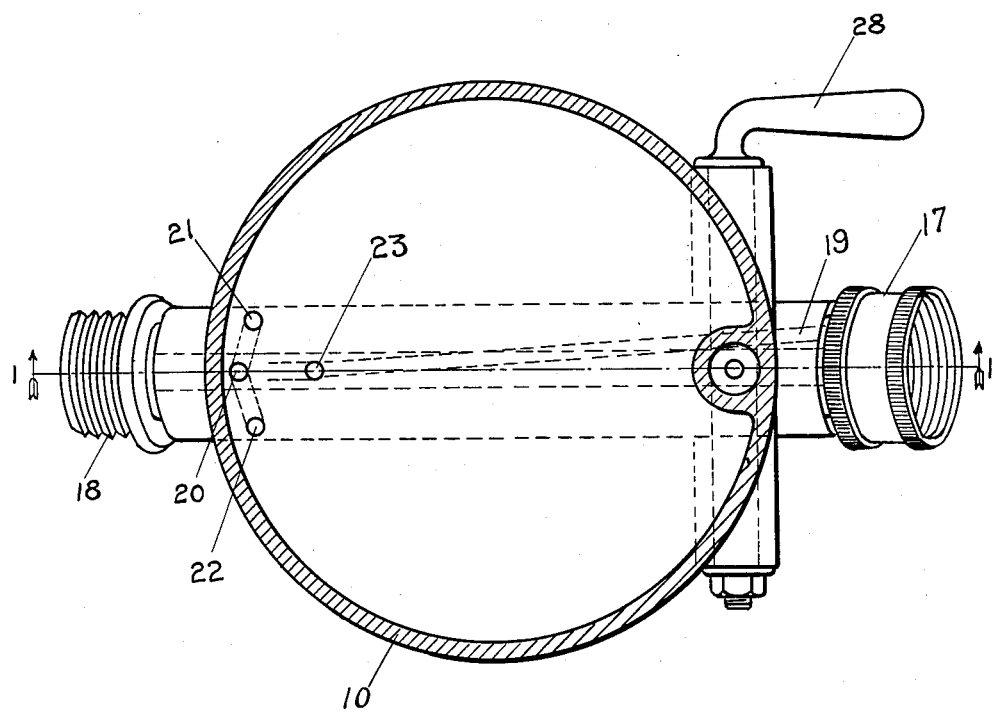
Figure 2 is a horizontal sectional view taken through 2—2 of Figure 1.

Referring now to the drawings, and in particular to Figs. 1 and 2, the numeral 10 refers to a vertically disposed container having a cover 11 removably threaded to the top portion thereof and an inclined bottom wall 12, which may be flat or arcuate tapering toward the lowermost portion thereof. At the bottom portion of the container 10 there is a tubular member 13 mounted on the outside wall thereof with threaded bores 14 and 15 contained at each end, and a fluid passageway 16 extending the full length of the tubular member 13. Threaded into the bores 14 and 15 are the hose couplings 17 and 18 forming the inlet and the outlet respectively. A second fluid passageway 19 is contained in the tubular member 13 and extends from the bore 14 and communicates with the chamber formed by the container 10 at the lowest portion of the inclined bottom wall 12 by means of a plurality of discharge outlets 20, 21, 22 and 23, each set at an angle to the chamber of the container 10 so as to cause the water discharged thereby to be directed in many directions within the container 10.

At the high point of the inclined lower wall of the container 10 there is a semi-cylindrical baffle plate 24 secured along the inside wall of the container 10 extending upwardly and terminating adjacent the top thereof to form an outlet passageway 25, at the base of which a bore 26 communicates with the fluid passageway 16 forward of the inlet bore 14. A manually operated rotary valve 27 is interposed in the bore 26 to control the discharge of fluid thereby, the valve 27 having a handle 28 for manipulation of the valve.

At the topmost portion of the outlet passageway 25, there is removably fitted on the baffle plate 24 a plug 29 having an orifice 29a of predetermined and calibrated size. The purpose of this plug 29 is to regulate the rate of flow of fluid mixture from the container 10 into the passageway 25. It is contemplated that a plurality of plugs 29 each having various sized orifices be provided so that they may be interchangeably used in the device. Obviously with all other factors being equal, the larger the size of the orifice 29a in the plug 29, the greater the flow will be from the chamber of the container 10, and vice versa.

In the normal operation of the device, the coupling 17 is threaded directly onto a water outlet or an outside hose bib and maintained in a vertical position thereby, or supported directly by a stand so as to be in the upright position as shown, with the coupling 18 connected to a hose. The cap 11 is removed, a plug 29 having the desired calibrated orifice placed in position and the container 10 is filled with fertilizer, insecticide or any other desired product, up to the height of the baffle plate 24. The cap 11 is replaced and the water is turned on. The main stream of water is directed through the passageway 16 while a portion of water is directed into the passageway 19 and through the outlets 20, 21, 22 and 23 where the water is discharged into the container 10 in jet sprays directed at different directions within the container 10. The water mixing with the material in the container 10 will flow over the baffle plate 24, through the orifice 29a, and through the passageways 25 and 26 and into the main stream of water in the passageway 16 by the Venturi action created therein. The jets of water being discharged into the container 10 will maintain the mixture of water and fertilizer or the like in an actively turbulent condition, and any tendency for caking will thereby be prevented. However, if any cakes are formed they will sink to the bottom and flow down the inclined wall 12 to the outlets 20, 21, 22 and 23, where the force of the jets of water will break up the solid mass into small particles thoroughly mixing with or being dissolved by the water. This action will continue until all of the fertilizer has been discharged from the container 10 since any remaining fertilizer in the container will tend to move down the inclined wall 12 where it is picked up and agitated by the water jets discharged through the outlets 20, 21, 22 and 23. In order to obtain a fairly uniform mixture of particles and water throughout the entire evacuation of the container 10, the valve 27 is opened slightly at the start of the mixing or dissolving action and as the fertilizer or the like in the container diminishes therein, the valve 27 is opened more and more until immediately before the container is emptied of the material the valve is at its maximum opened position. However, in those instances where the mixture of fertilizer and the like with relation to the volume flow of water is not critical, it is contemplated that the control of the mixture from the container 10 by the plug 29 and its calibrated orifice 29a will suffice to produce the desired mixture of fertilizer and water and thereby render the use of the valve 27 as unnecessary or the valve 27 itself eliminated entirely in the construction of the device.

Figure 3:
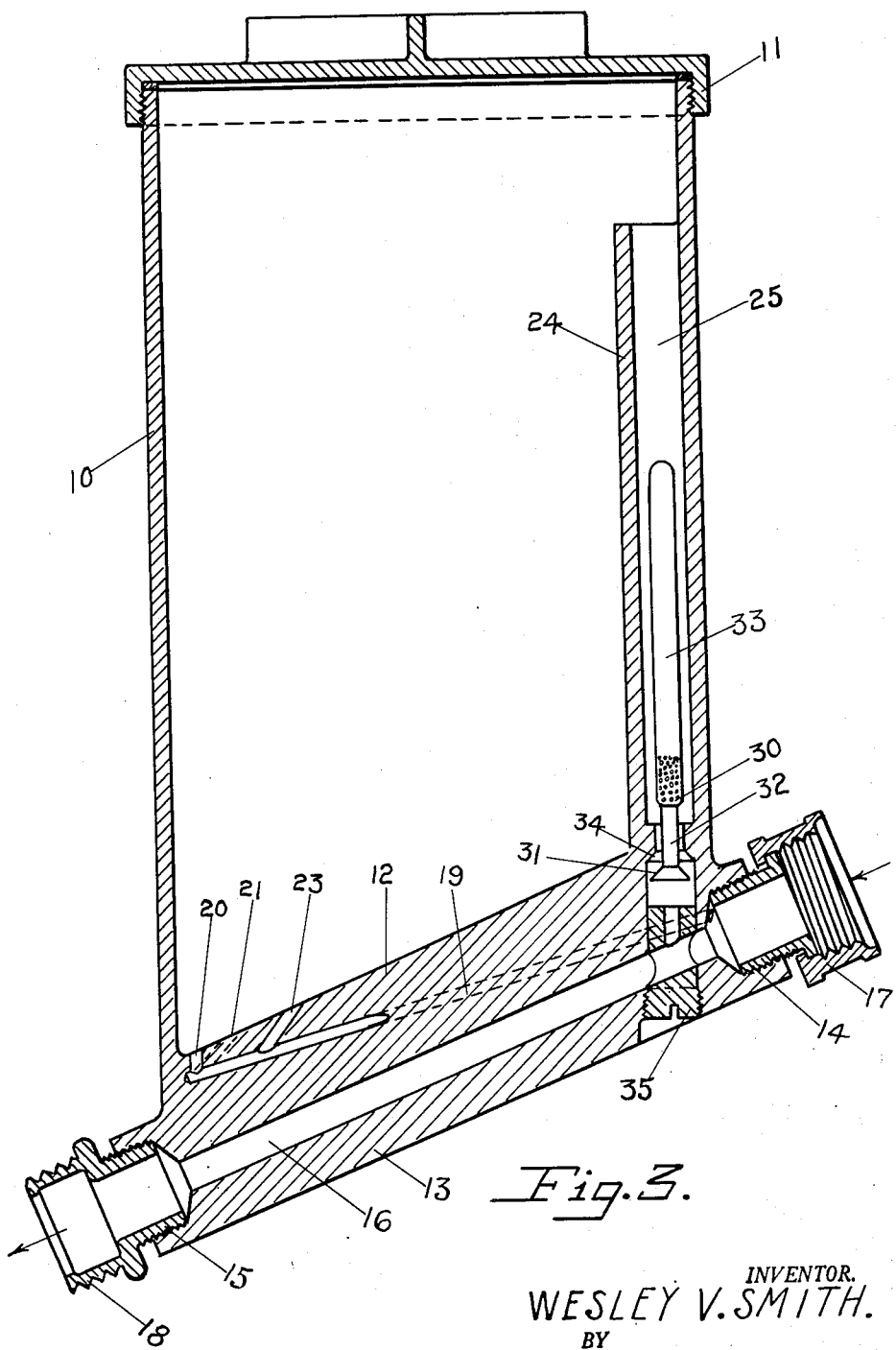
Figure 3 is a vertical sectional view similar to Figure 1 of a modified form of my invention showing automatic valve control means.

In those instances where a uniform mixture is critical throughout the entire evacuation of a container filled with a product such as an insecticide and the like, an automatically operated valve is provided as shown by Figure 3 of the drawings. This device is identical with the device illustrated by Figures 1 and 2 and described above except for a mixing valve generally designated by the numeral 30. The valve 30 consists of a valve body 31 having tapering side walls and a valve stem 32 secured at one end to the valve body 31 and at its other end to a hydrometer-type bulb 33 in which are contained the customary pellets for weighting the bulb 33, so that the valve 30 floats at a predetermined opening when the desired density of the discharging mixture is flowing therethrough. When the density of the mixture is greater than desired, the valve 30 will move in a direction toward a closed position while if the density is less than that for which the hydrometer is calibrated, the valve 30 will move in a direction toward its completely opened position. Therefore, with the rate of volume flow of water being constant, the amount of fertilizer in the mixture flowing past the valve 31 and being aspirated into the main body of the stream of water will remain approximately constant throughout the complete evacuation of the material contained in the container 10.

Having now disclosed my invention and realizing that, in view of my disclosure many other modifications in details and construction or design will readily occur to those skilled in the art, I do not choose to limit myself except as in the appended claims.

What I claim as new is:

1. A device for mixing and distributing fertilizer and the like comprising a container, said container having an inclined bottom wall, a main fluid passageway mounted along the bottom wall of said container having an inlet and an outlet, a second fluid passageway connecting said inlet of said main fluid passageway and said container at the lowermost portion of said bottom wall, a discharge duct connecting said container at the highermost portion of said bottom wall and said main fluid passageway adjacent said inlet, and a valve mounted in said duct for controlling the fluid flow through said duct.

2. A device of the class described comprising a container, said container having an inclined bottom wall, a cap removably secured on said container, a fluid inlet and outlet mounted at the bottom portion of said container, a main fluid passageway connecting said inlet and said outlet, a second passageway connecting said inlet and said container at the lowermost portion of said bottom wall, a baffle plate secured along its edges to the inside wall of said container at the highermost portion of said bottom wall forming a discharge passageway for said container, a discharge duct connecting said discharge passageway and said main fluid passageway adjacent said inlet, and a valve mounted in said discharge duct for controlling the flow of fluid therethrough.

3. A device of the class described comprising a container, a first fluid passageway mounted along the bottom wall of said container, a second fluid passageway connecting said first fluid passageway and said container, a baffle plate mounted on the inside wall of said container and extending to adjacent the top of said container forming an outlet passageway for said container, a duct connecting said first fluid passageway and said outlet passageway, a valve seat contained in said duct, a valve body adapted to control the flow of fluid past said valve seat, a valve stem mounted on said valve body and extending into said outlet passageway, and a weighted bulb secured to said valve stem and extending in said outlet passageway.

4. The structure as recited in claim 2 wherein said valve comprises a valve body, a valve stem connected to said valve body and extending into said discharge passageway, and a weighted bulb secured to said valve stem.

5. A device of the class described comprising a container having an inclined bottom wall, a main fluid passageway having an inlet and an outlet, a second fluid passageway connecting the inlet of said main fluid passageway and said container at the lowermost portion of said bottom wall, a fluid outlet for said container, a removable cap mounted on said fluid outlet, said cap having an orifice for controlling the flow of fluid therethrough, a duct connecting said fluid outlet and said main fluid passageway forward of said inlet.

6. A device for mixing and distributing fertilizer and the like comprising a container having an inclined bottom wall, a main fluid passageway having an inlet and an outlet, an inlet duct connecting said inlet with said container at substantially the lowermost portion of said inclined bottom wall, a discharge duct mounted in said container and extending upwardly therein, said discharge duct having an inlet and an outlet, and further duct means connecting said last named outlet with said main fluid passageway.

References Cited in the file of this patent

UNITED STATES PATENTS

| Number | Name | Date |
|---|---|---|
| 423,773 | Jewell | Mar. 18, 1890 |
| 1,632,806 | Smith | June 21, 1927 |
| 2,103,957 | Scott | Dec. 28, 1937 |
| 2,120,807 | Kundel | June 14, 1938 |
| 2,239,502 | Gleason | Apr. 22, 1941 |
| 2,513,566 | Kent | July 4, 1950 |
| 2,601,672 | Gatchet | June 24, 1952 |